US010148889B2

United States Patent
Furuya (10) Patent No.: US 10,148,889 B2
(45) Date of Patent: Dec. 4, 2018

(54) IMAGE PROCESSING APPARATUS AND CONTROL METHOD THEREOF, IMAGE CAPTURING APPARATUS AND STORAGE MEDIUM (71) Applicant: CANON KABUSHIKI KAISHA, Tokyo (JP)

(72) Inventor: Kohei Furuya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 202 days.

(21) Appl. No.: 14/670,826

(22) Filed: Mar. 27, 2015

(65) Prior Publication Data
US 2015/0288876 A1 Oct. 8, 2015

(30) Foreign Application Priority Data

Apr. 3, 2014 (JP) .................................. 2014-077284

(51) Int. Cl.
*H04N 5/235* (2006.01)
*H04N 5/232* (2006.01)

(52) U.S. Cl.
CPC ....... *H04N 5/2353* (2013.01); *H04N 5/23251* (2013.01); *H04N 5/23254* (2013.01); *H04N 5/23287* (2013.01)

(58) Field of Classification Search
CPC ......................... H04N 5/23251; H04N 5/2353
USPC ........................................................ 348/169
See application file for complete search history.

(56) References Cited

U.S. PATENT DOCUMENTS

| 5,708,864 | A | * | 1/1998 | Katayama | ................ G03B 5/00 396/155 |
|---|---|---|---|---|---|
| 6,044,228 | A | * | 3/2000 | Hara | ........................ G03B 5/00 396/246 |
| 7,432,953 | B2 | | 10/2008 | Washisu | |
| 7,944,474 | B2 | | 5/2011 | Ono | |
| 8,723,965 | B2 | | 5/2014 | Ishii et al. | |
| 8,736,691 | B2 | * | 5/2014 | Yumiki | .................... G03B 5/02 348/208.4 |

(Continued)

FOREIGN PATENT DOCUMENTS

| CN | 102318334 A | 1/2012 |
|---|---|---|
| JP | H06-051384 A | 2/1994 |

(Continued)

OTHER PUBLICATIONS

Sep. 5, 2017 Chinese Official Action in Chinese Patent Appln. No. 201510148739.1.

(Continued)

*Primary Examiner* — Jamie J Atala
*Assistant Examiner* — James T Boylan
(74) *Attorney, Agent, or Firm* — Venable LLP (57) ABSTRACT

An image capturing apparatus detects the movement of a main body by an angular velocity sensor, detects the movement of the captured object image, and detects the angular velocity. An exposure time during image capturing is set by an automatic exposure setting processing. A longest exposure time is calculated based on a maximum drive amount of an optical system including a correction lens, and the exposure time is set so as not to exceed the longest exposure time by upgrading a photographing condition. When an operation instruction for photographing is received, a drive control to relatively change a position of the object image to be captured is performed by driving the correction lens of the optical system in the period before the passage of the set exposure time.

6 Claims, 8 Drawing Sheets

(56) References Cited

U.S. PATENT DOCUMENTS

| | | | | |
|---|---|---|---|---|
| 2001/0048475 A1* | 12/2001 | Shiomi | ............... | H04N 5/23248 348/208.99 |
| 2005/0057662 A1* | 3/2005 | Washisu | ............... | H04N 5/2253 348/208.99 |
| 2006/0050157 A1* | 3/2006 | Tsuruoka | ................. | H04N 5/21 348/241 |
| 2006/0238621 A1* | 10/2006 | Okubo | ................... | G03B 7/097 348/208.99 |
| 2007/0019937 A1* | 1/2007 | Endo | ....................... | G03B 7/093 396/52 |
| 2007/0097221 A1* | 5/2007 | Stavely | ............... | H04N 5/23248 348/208.11 |
| 2007/0110418 A1* | 5/2007 | Imada | ...................... | G03B 5/04 396/55 |
| 2007/0206935 A1* | 9/2007 | Ono | ....................... | G03B 7/093 396/55 |
| 2009/0231449 A1* | 9/2009 | Tzur | ...................... | H04N 5/145 348/208.6 |
| 2010/0149384 A1* | 6/2010 | Iijima | .................... | H04N 5/217 348/241 |
| 2011/0164863 A1* | 7/2011 | Hayashi | ............... | G02B 27/646 396/55 |
| 2011/0317044 A1 | 12/2011 | Ishii et al. | | |

FOREIGN PATENT DOCUMENTS

| | | |
|---|---|---|
| JP | 2006-317848 A | 11/2006 |
| JP | 2007-288726 A | 11/2007 |
| JP | 2010-245774 A | 10/2010 |

OTHER PUBLICATIONS

Jan. 23, 2018 Japanese Official Action in Japanese Patent Appln. No. 2014-077284.

* cited by examiner

IMAGE PROCESSING APPARATUS AND CONTROL METHOD THEREOF, IMAGE CAPTURING APPARATUS AND STORAGE MEDIUM

BACKGROUND OF THE INVENTION

Field of the Invention

The present invention relates to an image processing apparatus and a control method thereof, and relates to a technique for performing user assistance of a follow shot by an image capturing apparatus.

Description of the Related Art

A follow shot exists as a photographic technique for expressing a sense of speed of an object (moving body). This photographic technique is intended for stopping a moving object image and following a background image by performing panning of a camera with the movement of the object by a photographer. In a typical follow shot, an exposure time is adjusted so as to be longer than that in a normal time with a moving speed of the object. Japanese Patent Laid-Open No. 2010-245774 discloses a configuration for performing photographing in an exposure time so as to sufficiently secure a follow amount of the background during the follow shot.

If a panning velocity is not appropriate when the photographer performs panning with the movement of the object in the follow shot, a difference occurs between the moving speed of the object and the panning velocity, whereby the object images are often blurred. To solve the inconvenience, there has been proposed a method of absorbing the difference between the moving speed of the object and the panning velocity by the movement of a shift lens (hereinafter referred to as "follow shot assistance"), which serves as a technique for assisting the follow shot by a user. Japanese Patent Laid-Open No. 2006-317848 disclose discloses an apparatus that detects the object based on a blur detection by a gyro sensor and a motion vector of the image and calculates a correction amount for positioning the detected object at a center of the image. An optical axis is corrected by the movement of the shift lens and the follow shot is performed.

In the correction by using the shift lens disclosed in Japanese Patent Laid-Open No. 2006-317848, a maximum angle where a system can correct (hereinafter referred to as "maximum correctable angle") is limited because the movable range of the shift lens is limited. Therefore, a situation in which the system cannot correct may occur. Hereinafter, a specific description will be given by assuming a situation shown in FIG. 9.

Figure 9:
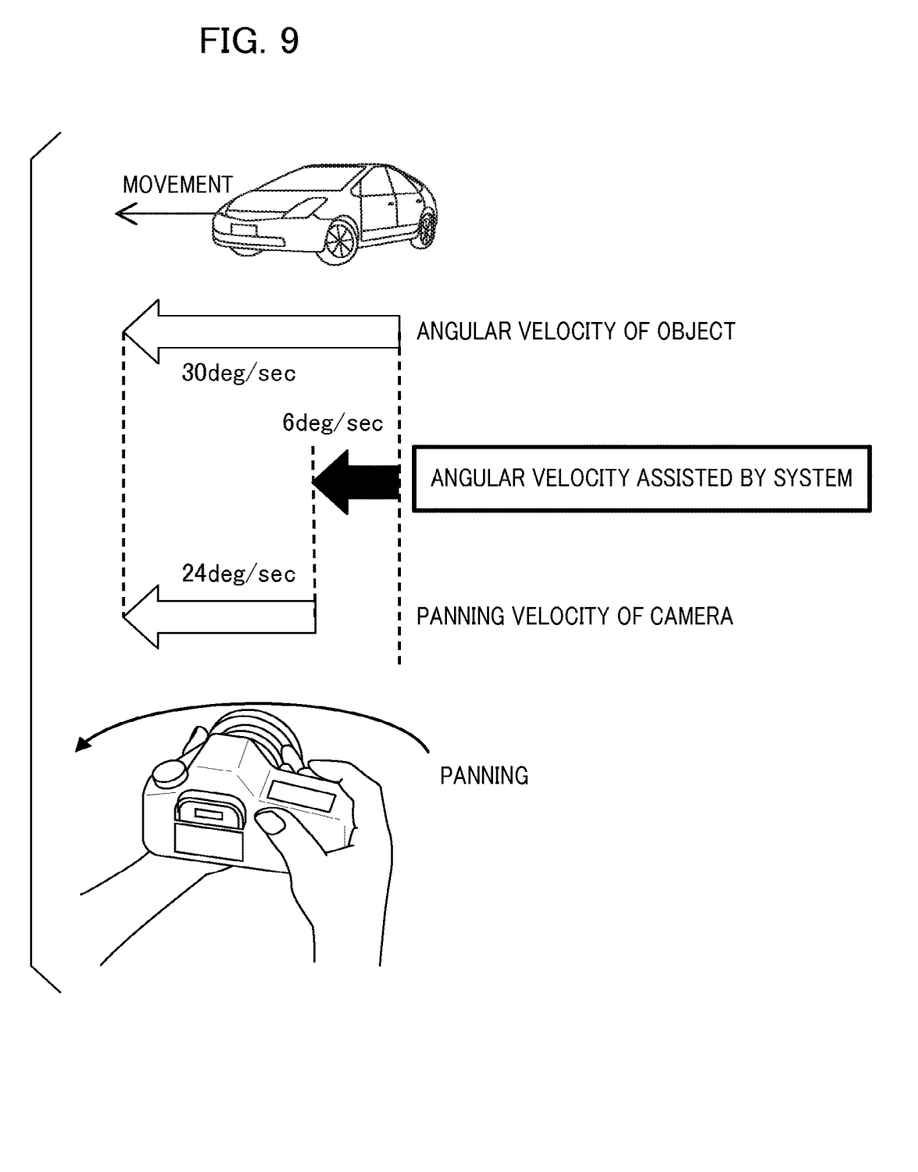
FIG. 9 is an explanatory diagram of an angular velocity of an object and a panning angular velocity of a camera.

FIG. 9 illustrates the speed of the object and the panning velocity of the camera, each of which is shown by angular velocities centering on the principal points. The angular velocity of the object is at 30 deg/sec and the panning angular velocity of the camera is at 24 deg/sec in degrees. In this case, a camera system needs to assist 6 deg/sec, which is the difference between both of the angular velocities. A value multiplying the angular velocity assisted by the system by the exposure time becomes a correction angle by which the system will finally need to assist. As one example, a photographing in which the maximum correctable angle of the shift lens is 0.4 degrees and the exposure time is $\frac{1}{16}$ seconds is assumed. The correction angle finally needed is below.

$$6 \times \frac{1}{16} = 0.375 \ (\leq 0.4) \quad \text{[Formula 1]}$$

In this example, the correction angle is the maximum correctable angle or below, and thus, the correction is possible.

In contrast, when photographing in which the exposure time is $\frac{1}{8}$ seconds is performed, the correction angle finally needed is below.

$$6 \times \frac{1}{8} = 0.75 \ (> 0.4) \quad \text{[Formula 2]}$$

In this example, the correction angle exceeds the maximum correctable angle, and thus, the correction becomes impossible. The follow shot needs a long exposure time and the correction angle exceeds the maximum correctable angle, and thus, the correction may be impossible.

SUMMARY OF THE INVENTION

The present invention provides an image processing apparatus and a control method thereof in which an exposure time is calculated and set when a position of an object image in an image to be imaged is corrected by a correction unit, for example, a user assistance function for a follow shot.

An apparatus according to the present invention is an image processing apparatus that corrects a position of an object image in an image to be captured by a correction unit, and comprises an exposure time setting unit configured to set an exposure time during image capturing; and a drive control unit configured to control the position of the object image in the direction that is perpendicular to an optical axis by driving the correction unit. The exposure time setting unit determines a difference between an output of a first detection unit that detects the movement of the apparatus and an output of a second detection unit that detects the movement of the object image, and an upper limit value of the exposure time based on an upper limit of a correction range by the correction unit, and limits the exposure time during image capturing to the upper limit value or below.

According to the present invention, the exposure time can be calculated and set when the position of the object image in the image to be imaged is corrected by the correction unit.

Further features of the present invention will become apparent from the following description of exemplary embodiments (with reference to the attached drawings).

DESCRIPTION OF THE EMBODIMENTS

Hereinafter, each of the embodiments of the present invention will be described in detail based on attached drawings. In each of the embodiments, a description will be given of a drive control configuration that relatively changes a position where an object image is captured, by the movement of an optical member for correction provided in an optical system.

First Embodiment

Figure 1:
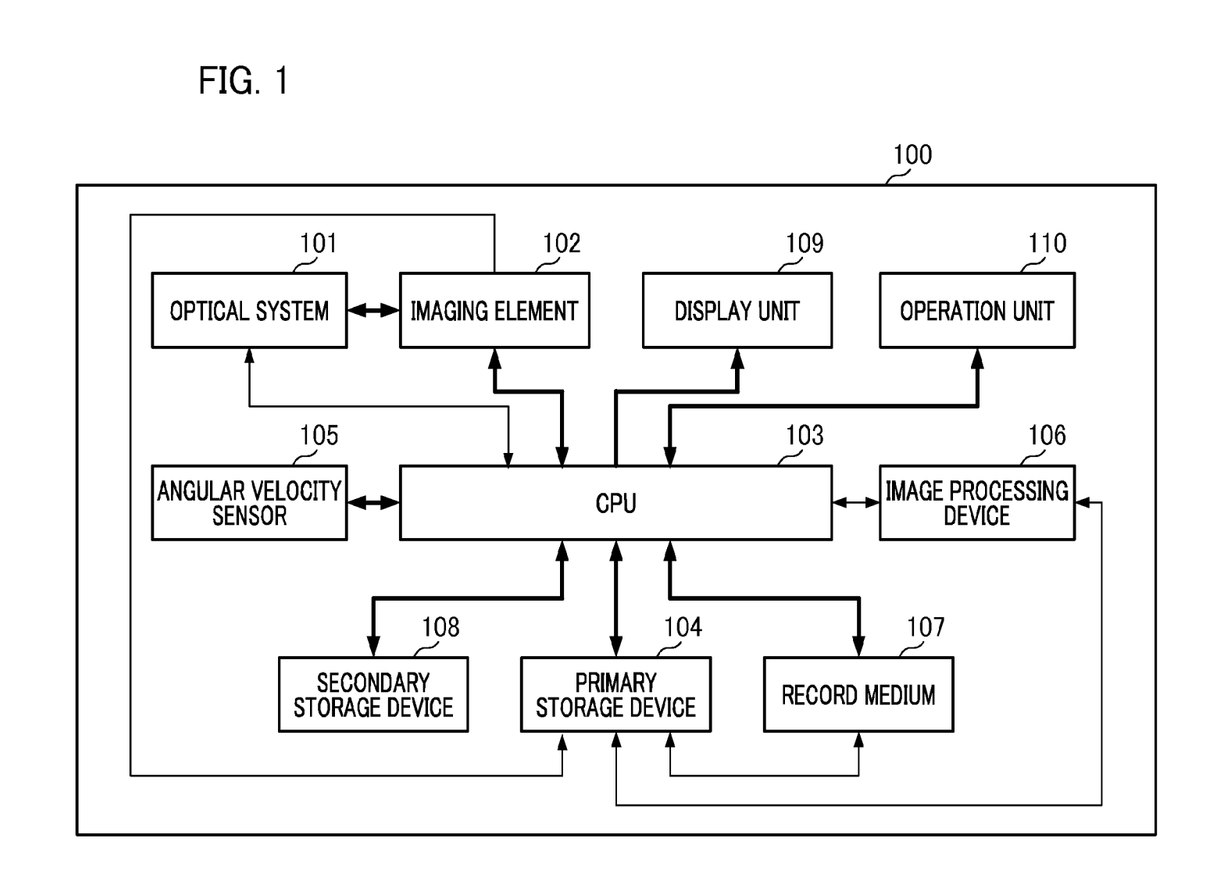
FIG. 1 is a block diagram illustrating a configuration example of an image capturing apparatus shared by embodiments of the present invention.

FIG. 1 is a block diagram illustrating a basic configuration of an image capturing apparatus 100 to which an image processing device (including an image processing device 106 and a controller) is applied according to first embodiment of the present invention. The image capturing apparatus 100 may be not only a camera, for example, a digital camera or a digital video camera, but also an electronic apparatus provided with a camera function, for example, a mobile phone with a camera function or a computer with a camera. An optical system 101 is an image forming optical system provided with, for example, a lens group, a shutter, and a diaphragm. The lens group includes a correction lens (shift lens) and a focus lens. The optical system 101 images the light from the object onto an imaging element 102 according to a control signal of a CPU (Central Processing Unit) 103. The imaging element 102 is an image capturing device, for example, a CCD (Charge Coupled Device) image sensor, a CMOS (Complementary Metal Oxide film Semiconductor) image sensor, and converts the imaged light via the optical system 101 into an image signal by photoelectric conversion.

Angular velocity, which shows a moving amount of the image capturing apparatus 100, is detected in a first detection processing using an angular velocity sensor 105, for example, a gyro sensor. The angular velocity detection signal is output to the CPU 103, which serves as an electric signal. The CPU 103 executes a program that is previously stored in a memory, and controls each of units configuring the image capturing apparatus 100 according to an input signal and the like. A primary storage device 104 is a volatile storage device, for example, a RAM (Random Access Memory), stores temporary data, and used as a work memory of the CPU 103. Information stored in the primary storage device 104 is used by an image processing device 106 or may be recorded in a recording medium 107. A secondary storage device 108 is a nonvolatile storage device, for example, an EEPROM (Electrically Erasable Programmable Read-Only Memory). A program (firmware) for controlling the image capturing apparatus 100 and various setting information are stored in the secondary storage device 108 and they are utilized by the CPU 103.

The recording medium 107 records photographing image data and the like stored in the primary storage device 104. The recording medium 107 is removable from the image capturing apparatus 100 as, for example, a semiconductor memory card. The data recorded in the recording medium 107 is readable by mounting it to an external device, for example, a personal computer. That is, the image capturing apparatus 100 has an attaching and detaching mechanism and a reading and writing function of the recording medium 107. A display unit 109 displays, for example, a view finder image during photographing, a photographed image, and a GUI (Graphical User Interface) image for an interactive operation. The operation unit 110 is an input device group that receives a user's operation and transmits input information to the CPU 103, and includes, for example, a button, a lever, and a touch panel. Additionally, it can use an input device using, for example, recognizing functions including a sound or one's eyes for the operation.

The image capturing apparatus 100 of the present embodiment has a plurality of image processing patterns which the image processing device 106 applies to a captured image, and this pattern can be set as an image capturing mode by the operation unit 110. The image processing device 106 performs image processing referred to as "development processing", and various kinds of processing such as the adjustment of color tone corresponding to the photographing mode. Note that, the CPU 103 may realize at least a part of the functions of the image processing device 106 by using software processing.

Figure 2A:
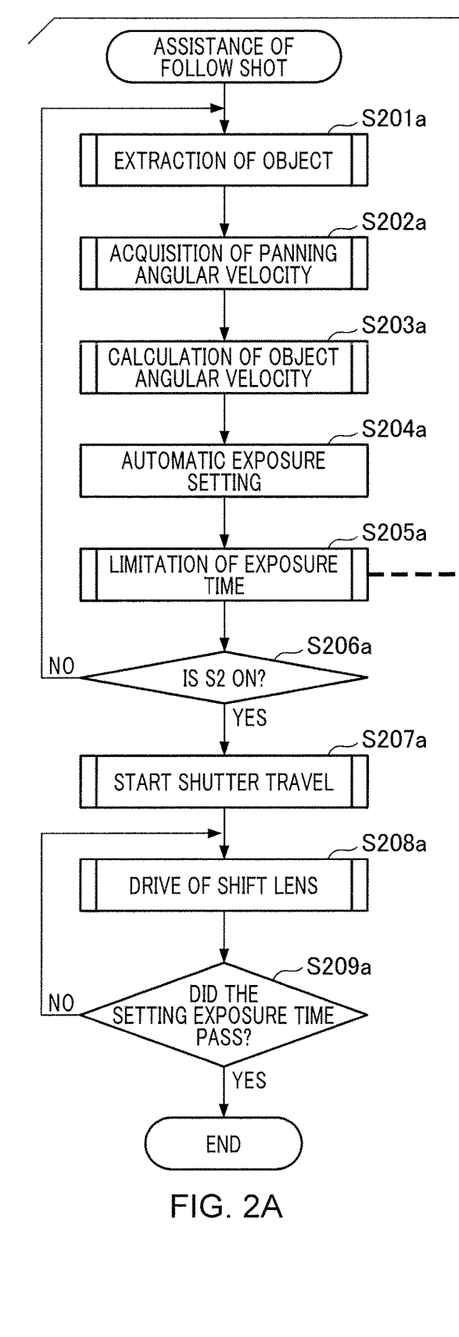
FIGS. 2A and 2B are flowcharts illustrating a process according to a first embodiment.
Figure 2B:
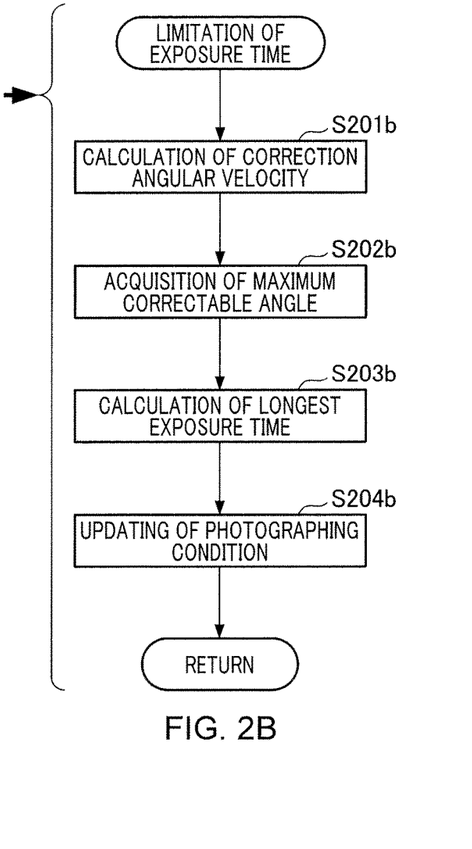
Figure 3:
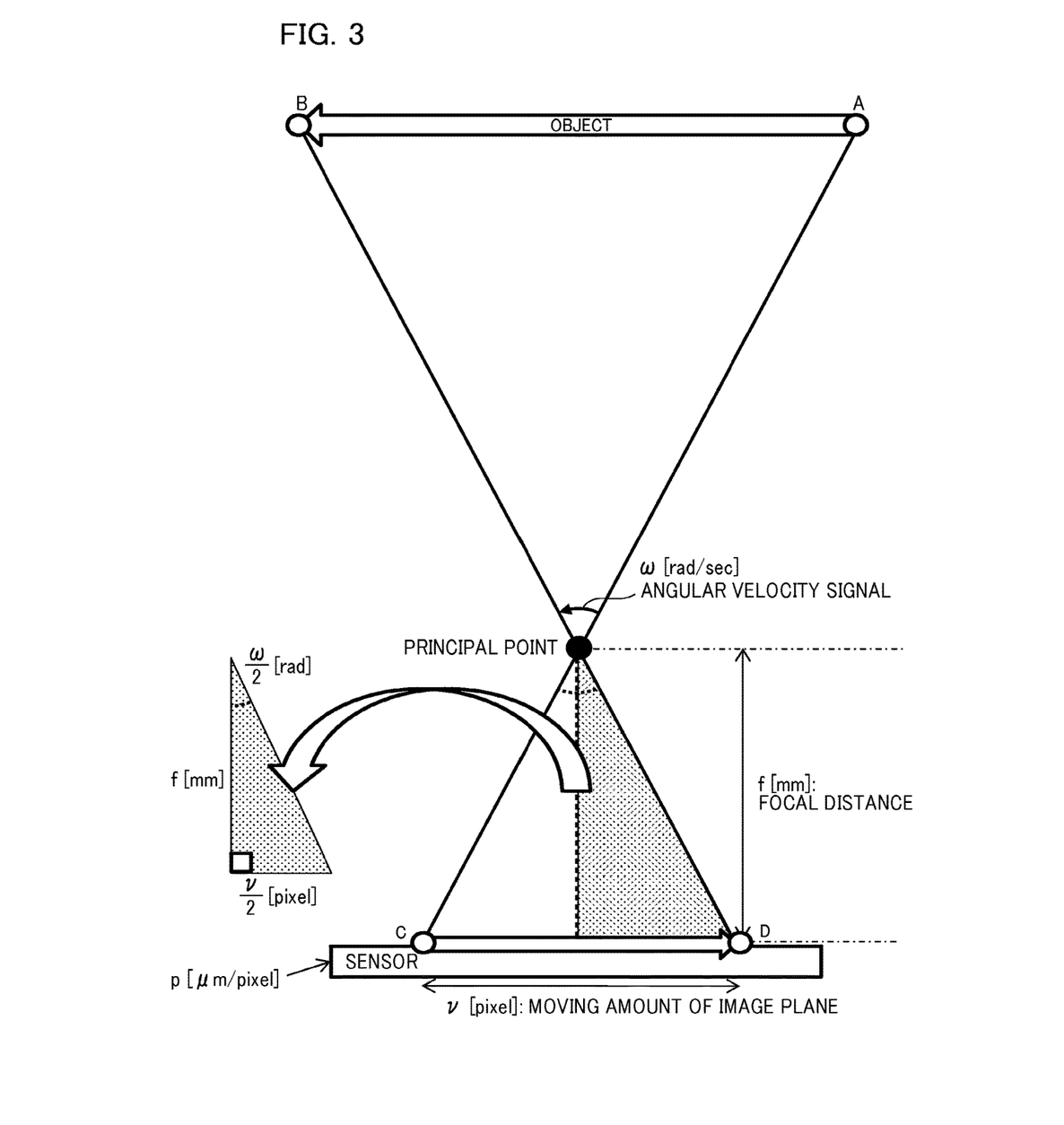
FIG. 3 is a diagram for explaining a calculation of an angular velocity signal according to the first embodiment.

Processing for calculating the exposure time during the follow shot will be described with reference to FIGS. 2A and 2B. FIGS. 2A and 2B are flowcharts illustrating a flow of assistance of the follow shot. A start timing of the processing is, for example, a time of a half-depression operation of a shutter release button included in the operation unit 110. First, in step S201a, the CPU 103 performs extraction processing of the object image. Note that, with respect to the extraction of the object image, there is a method of extracting an object area by using a motion vector acquired from the captured image, as disclosed in Japanese Patent Laid-Open No. 2006-317848. In the following step S202a, the CPU 103 acquires angular velocity information of the image capturing apparatus 100 that is detected by the angular velocity sensor 105. The panning angular velocity is acquired from a detection signal output from the angular velocity sensor 105. The process proceeds to step S203a and the CPU 103 calculates the angular velocity of the object. The CPU 103 executes second detection processing that detects the movement of the object image by using the image data captured by the imaging element 102. In the present embodiment, the calculation is performed with the panning angular velocity, and therefore the angular velocity of the object is calculated as the angular velocity centered on the principal points as shown in FIG. 3. The calculation method of the angular velocity will be described by using a circular measure with reference to FIG. 3.

FIG. 3 illustrates that the object moves from a point A to a point B in "t" seconds and the object image formed on an image plane of the imaging element 102 accordingly moves from a point C to a point D. Here, a distance between the point C and the point D (image plane moving amount) is v [pixel], the focal length is f [mm], and a pixel pitch of the imaging element 102 is p [μm/pixel]. The angular velocity ω [rad/sec] of the object image on the image plane is denoted by formula below.

$$\tan\frac{\omega}{2}[\text{rad/sec}] = \frac{v}{2}[\text{pixel}] \times \frac{p}{1000}[\text{mm/pixel}] \div t[\text{sec}] \div f[\text{mm}] = \frac{vp}{2000tf}$$

$$\omega = 2\tan^{-1}\left(\frac{vp}{2000tf}\right)[\text{rad/sec}]$$

[Formula 3]

When a photographer performs a panning operation of the image capturing apparatus, the angular velocity ω of the object image on the image plane is acquired by subtracting the panning angular velocity $\omega_p$ from the angular velocity $\omega_s$ of the object itself (hereinafter referred to as "object angular velocity") (Formula 4).

$$\omega = \omega_s - \omega_p \quad \text{[Formula 4]}$$

Accordingly, the object angular velocity $\omega_s$ is calculated by using a formula below based on the panning angular velocity $\omega_p$ of the image capturing apparatus 100 detected at the angular velocity sensor 105.

$$\omega_s = \omega + \omega_p \quad \text{[Formula 5]}$$

Note that, other than the above, the method of calculating the object angular velocity $\omega_s$ may use a value previously designated from the operation unit 110.

Thus, when the object angular velocity $\omega_s$ is calculated, the CPU 103 performs an automatic exposure setting in step S204a. In the automatic exposure setting, the exposure time during photographing is set. For example, it is possible to perform photographing at a predetermined exposure time longer than a normal exposure time, or it is possible to calculate the exposure time according to the object angular velocity $\omega_s$. Imaging processing following step S207a is performed based on a photographing instruction provided by the user through the operation unit 110 normally according to the calculated exposure time. In the present embodiment, a process in which the CPU 103 limits the exposure time is performed in the following step S205a. Specifically, the exposure time is changed if the exposure time during image capturing set in step S204a is not appropriate. "The exposure time is not appropriate" specifically means that the correction angle by the correction unit exceeds a maximum correctable angle. A flow of the exposure time limit will be described with reference to FIG. 2B.

First, the CPU 103 calculates the correction angular velocity in step S201b. The angular velocity ω on the aforementioned image plane is directly used, or the correction angular velocity $\omega_r$ is calculated by a formula below by using the object angular velocity $\omega_s$ and the panning angular velocity $\omega_p$, as a difference between them. Note that, when the angular velocity ω on the image plane is directly used, the moving speed is calculated based on the time change of the captured object image and is converted to the angular velocity ω.

$$\omega_r = \omega_s - \omega_p \quad \text{[Formula 6]}$$

In the following step S202b, the CPU 103 acquires the maximum correctable angle. The maximum correctable angle corresponds to a maximum angle where the optical system 101 can correct by the movement of the shift lens (correction lens) or the like. For example, if the optical system 101 is previously fixed to a camera body, the maximum correctable angle of the optical system 101 that was previously stored in the secondary storage device 108 or the like can be read out. Alternatively, if the optical system 101 is removable from the camera body, the maximum correctable angle of the optical system 101 can be acquired via communication with the camera body and the optical system 101. Alternatively, it is possible to read out the maximum correctable angle corresponding to each of the optical systems, which was previously stored in the secondary storage device 108 or the like. Note that a drive control to move the shift lens provided in the optical system 101 to a direction that differs from the optical axis direction (for example, a direction orthogonal to the optical axis) is performed according to a control signal that is output to a drive mechanism section (not illustrated) from the CPU 103. That is, the CPU 103 executes the control to relatively displace the position in the image where the object image is captured by the drive control of the shift lens.

In step S203b, the CPU 103 calculates the longest exposure time that is the upper limit of the exposure time and performs the setting processing of the exposure time. For example, the maximum correctable angle is $\theta_{max}$ [deg] and the correction angular velocity calculated in step S201b is $\omega_r$. The maximum correctable angle corresponds to the upper limit of the correction range by the correction unit, for example, the shift lens. In this case, the longest exposure time $t_{max}$ is determined by dividing $\theta_{max}$ by $\omega_r$ as below.

$$t_{max} = \frac{\theta_{max}}{\omega_r} \quad \text{[Formula 7]}$$

The CPU 103 updates a photographing condition in step S204b, based on the calculated longest exposure time $t_{max}$. One example of the updating of the photographing condition will be described with reference to Table 1 below. Table 1 illustrates an example of the photographing condition determined by steps S204a and S204b. In table 1, a time to expose the object image to the imaging element 102 is represented by Tv and electric gain of the imaging element 102 is represented by ISO.

TABLE 1

|  | Tv | ISO |
| --- | --- | --- |
| NORMAL PHOTOGRAPHING | 1/64 | 800 |
| S204a | 1/8 | 100 |
| S204b | 1/16 | 200 |

For example, a case is assumed in which "Tv=1/64, ISO=800" is used as the photographing condition in normal photographing and the follow shot is performed. In step S204a of FIGS. 2A and 2B, the photographing condition of "Tv=1/8, ISO=100" is set so as to enable performing the photographing in an exposure time longer than the normal photographing, having the same brightness in the follow shot under the photographing condition in the normal photographing. In this photographing condition, when, for example, the correction angular velocity $\omega_r$ is 6 deg/sec in degrees, the angle finally corrected is denoted as below.

$$6 \times \frac{1}{8} = 0.75 \quad \text{[Formula 8]}$$

In contrast, the correction is possible if the maximum correctable angle $\theta_{max}$ is over 0.75 deg. However, the correction is impossible if the maximum correctable angle $\theta_{max}$ is, for example, 0.4 deg. When the maximum correctable angle $\theta_{max}$ 0.4 deg and correction angular velocity 6 deg/sec are substituted for the formula 7, the longest exposure time $t_{max}$ is denoted as below.

$$t_{max} = \frac{\theta_{max}}{\omega_r} = \frac{0.4}{6} = \frac{1}{15} \quad \text{[Formula 9]}$$

1/15 [sec] calculated in the formula 9 becomes the correctable longest exposure time $t_{max}$, and therefore, for example, the photographing condition of "Tv=1/16, ISO=200" is set in step S204b of FIGS. 2A and 2B in the present embodiment. That is, the exposure time during image capturing is limited to the longest exposure time or below (upper limit or below).

When the photographing condition is thus updated, it is determined whether or not the CPU 103 performs an exposure operation in S206a of FIGS. 2A and 2B. It is determined whether or not a switch (hereinafter, referred to as "S2") is in an ON status due to a full-depression operation of the shutter release button included in the operation unit 110. When the status of S2 is OFF, the CPU 103 repeatedly executes the operations from steps S201a to step S205a. Alternatively, when the status of S2 is ON in step S206a, the CPU 103 advances the process to step S207a.

In step S207a, the CPU 103 controls the shutter included in the optical system 101 according to the exposure time determined by the exposure time setting processing, and starts the shutter travel. Hereafter, the CPU 103 moves the shift lens of the optical system 101 in step S208a until the passage of the exposure time set in step S204b, and performs the assist processing of the follow shot. In S209a, when the exposure time set in step S204b passes, the process ends.

In the present embodiment, the exposure time that is the longest exposure time or below is calculated and set when the position of the object image in the direction that is perpendicular to an optical axis in the image to be captured is corrected by the correction unit. The photographing condition where the camera system can assist (exposure time) can be calculated in, for example, a user assistance function by the follow shot assistance. Note that a configuration in which the automatic exposure setting is performed in step S204a and the photographing condition in step S204b is updated is exemplified in the present embodiment, in order to clarify the difference from the conventional method. However, the present invention is not limited to such a configuration and, for example, the photographing condition can be set only in step S204b without performing step S204a. Additionally, the example in which the image formation position of the object is corrected by the movement of the optical member (shift lens) is shown in the present embodiment, but the present invention is not limited to this, and, for example, it can be realized in a configuration in which the imaging element 102 itself is driven and controlled. Additionally, the panning operation is described in the present embodiment, and a similar processing is executed for a tilting operation.

Second Embodiment

Next, a second embodiment of the present invention will be described. Note that the reference numerals already used are provided to each element of the present embodiment corresponding to each element of the first embodiment, and the descriptions thereof are omitted. Such omission of the description will be similarly applied to another embodiments described below.

Figure 4A:
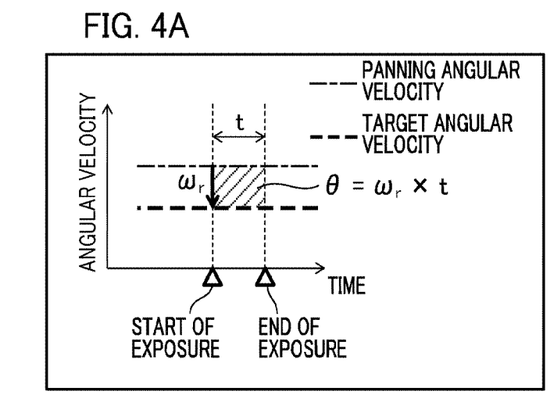
FIGS. 4A to 4D are explanatory diagrams of final correction angles in second and third embodiments.

In the first embodiment, the example in which the longest exposure time is calculated by always using a latest correction angular velocity $\omega_r$ in formula 7 is shown. A case in which the target angular velocity and the panning angular velocity are always constant is assumed, for example, as shown in FIG. 4A. A horizontal axis is a time axis and a vertical axis is an angular velocity axis. The correction angular velocity is $\omega_r$, the exposure time is t, and angle θ that finally needs to be corrected is denoted as a formula below.

$$\theta = \omega_r \times t \qquad \text{[Formula 10]}$$

This angle θ corresponds to an area shown with oblique lines in FIG. 4A. A formula below can be acquired by substituting $t_{max}$ that is calculated in the formula 7, as the exposure time t.

$$\theta = \omega_r \times t_{max} = \omega_r \times \frac{\theta_{max}}{\omega_r} = \theta_{max} \qquad \text{[Formula 11]}$$

Figure 4B:
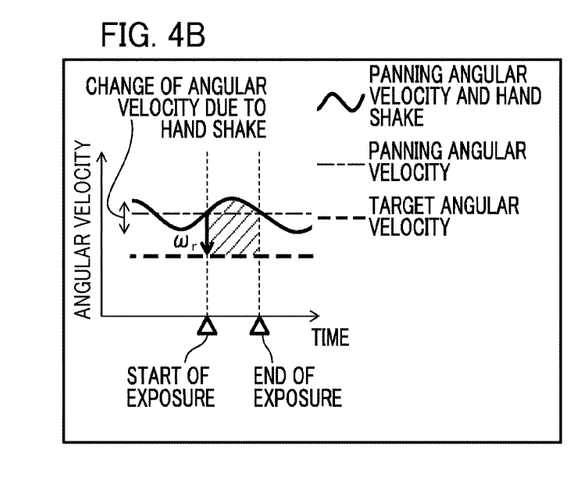

The angle θ that finally needs to be corrected is within the maximum correctable angle $\theta_{max}$, whereby the correction is possible. However, in the actual photographing, there may be a case where a fluctuation occurs to the panning angular velocity due to a hand shake, as shown by the dotted lines in FIG. 4B. The horizontal axis is the time axis and the vertical axis is the angular velocity axis. In this case, the value of the angle θ that needs to be corrected corresponds to an area shown with oblique lines in FIG. 4B, and it becomes larger than an angular value shown in FIG. 4A. In this case, when the angle θ exceeds the maximum correctable angle $\theta_{max}$, the correction is impossible.

Figure 4C:
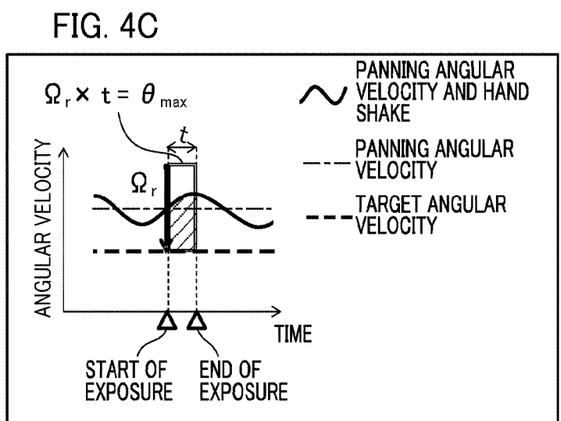

A solution to this inconvenience will be described below. For example, as shown in FIG. 4C, when a large correction angular velocity (written as $\Omega_r$) has been previously estimated as the correction angular velocity, the exposure time t calculated from the formula 7 is underestimated. Accordingly, the angle θ that needs to be actually corrected, shown with oblique lines, is easily encompassed within the maximum correctable angle $\theta_{max}$ shown with a rectangle in the drawing. According to this method, it is possible to reduce the possibility in which the angle θ that needs to be corrected exceeds the maximum correctable angle $\theta_{max}$. However, there may be a case where the longest exposure time $t_{max}$ calculated in formula 7 becomes excessively short. While the flow amount of the background image increases as the exposure time becomes longer during the follow shot, which results a more effective follow shot, the effect of the follow shot decreases when the exposure time is too short. Accordingly, the calculation processing of the correction angular velocity $\Omega_r$ used for the calculation of such a longest exposure time $t_{max}$ is shown in the present embodiment and third embodiment described below.

Figure 4D:
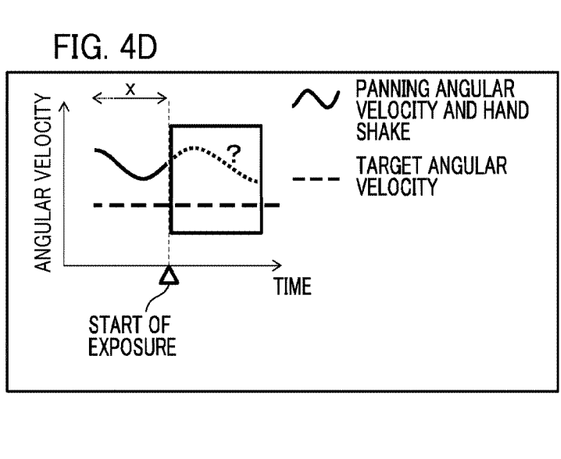

An example of the information used for estimating the correction angular velocity $\Omega_r$ will be described with reference to FIG. 4D. In the process, a past panning angular velocity corresponding to a range "x" shown in the drawing is referred to. When the correction angular velocity used for the calculation of the longest exposure time $t_{max}$ in step S203b is determined by using the past panning angular velocity, the following matters are key points:
(A) A period of data to be employed (the data group of the panning angular velocity in which time should be used)
(B) Calculation method of the correction angular velocity $\Omega_r$ (how the correction angular velocity $\Omega_r$ should be calculated from the data group)

For example, the calculation result of the longest exposure time $t_{max}$ differs depending on the data group of the panning angular velocity to be used. Accordingly, a description will be given of an example of the calculation processing of the correction angular velocity $\Omega_r$ used for conducting the longest exposure time $t_{max}$ from the data group of the panning angular velocity temporally continued, with respect to the matter (A), in the present embodiment. With respect to the matter (B), the calculation processing of the correction angular velocity $\Omega_r$ will be described in third embodiment described below. Note that the example of calculating "the correction angular velocity when the difference between the panning angular velocity and the target angular velocity is largest" is shown from the data group of the panning angular velocity in the predetermined period, in the present embodiment. The calculation of the correction angular velocity $\Omega_r$ used for the calculation of the exposure time during the follow shot will be described as below with reference to FIG. 5.

Figure 5:
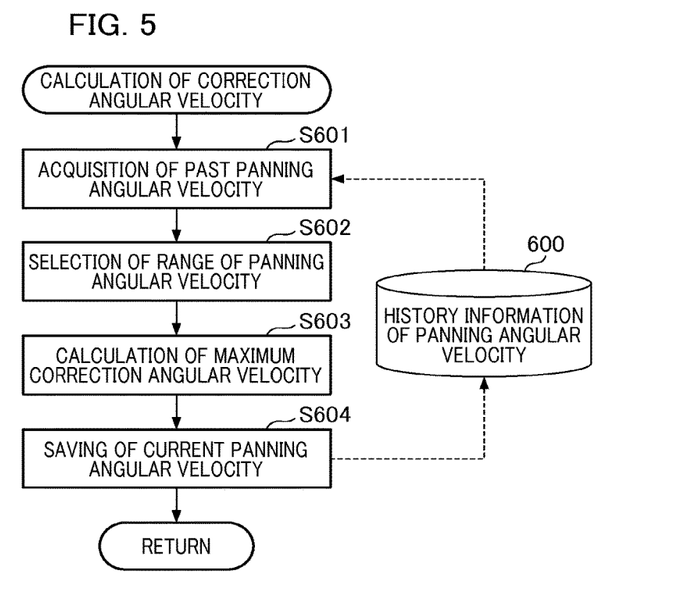
FIG. 5 is a flowchart illustrating a calculation processing of a correction angular velocity according to the second embodiment.

FIG. 5 is a flowchart that illustrates a flow of the calculation processing of the correction angular velocity $\Omega_r$ in the present embodiment, and corresponds to the calculation processing of the correction angular velocity of step S201b shown in FIGS. 2A and 2B. First, the CPU 103 acquires information of the past panning angular velocity in step S601. The acquisition of this information is performed by reading history information of the past panning angular velocity recorded in step S604 described below, for example, from the primary storage device 104. In the following step S602, the CPU 103 selects the data group of the panning angular velocity within the predetermined range from the information of the past panning angular velocity and the information of the latest panning angular velocity that is acquired in step S202a of FIGS. 2A and 2B. In step S603, based on the data group of the panning angular velocity selected in step S602, the CPU 103 calculates the correction angular velocity in the panning angular velocity where the difference with the target angular velocity becomes largest from among these.

Figure 6:
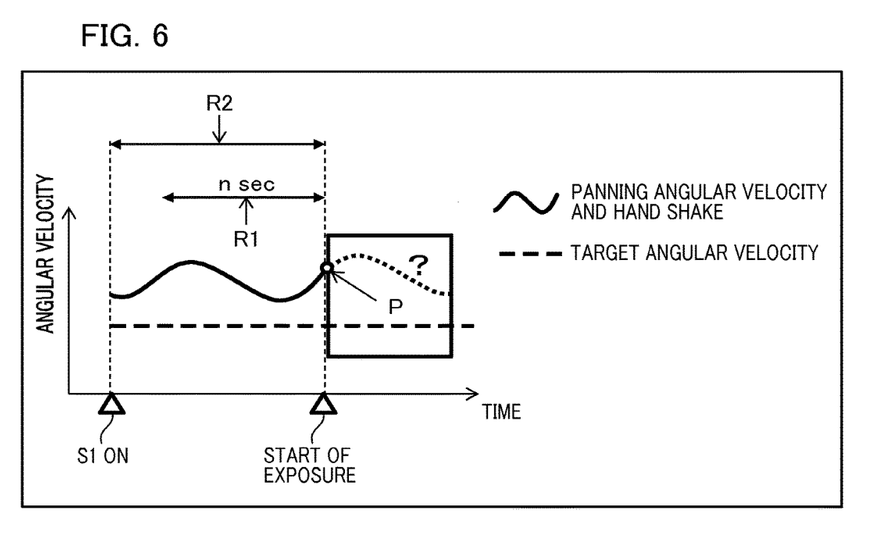
FIG. 6 is a diagram illustrating an example of a range selection of panning angular velocity according to the second embodiment.

Next, the selection processing of the range of the data group of the panning angular velocity will be described with reference to FIG. 6. In FIG. 6, the horizontal axis is the time axis and the vertical axis is the angular velocity axis. First, a first selection method according to the data group of the panning angular velocity is a method for always selecting the most recent panning angular velocity, as shown in P of FIG. 6. In the first selection method, the calculation method performed in the first embodiment is similar because the information of the past panning angular velocity acquired in step S601 is not used. In this case, there is an advantage in which information highly relevant to the panning angular velocity during the actual photographing can be used because the panning angular velocity immediately before the exposure start is referred to. However, as mentioned above, a case in which the correction angle exceeds the maximum correctable angle may occur if the actual correction angular velocity is larger than the correction angular velocity immediately before the exposure start.

A third selection method will be described before describing a second selection method. The third selection method is a method for selecting a data group in a range between a given time point and immediately before the exposure start (past period) as in the range shown by R2 in FIG. 6. The given time point means a time point when the image capturing apparatus receives an operation instruction for photographing by the user's operation. For example, it is when the half-depression operation of the shutter release button included in the operation unit 110 is performed (written as "S1 ON" in the drawing). In this method, the maximum correction angular velocity is calculated from among more data, and a possibility in which the actual correction angular velocity exceeds the correction angular velocity calculated in the predetermined period is accordingly low. Therefore, the probability that the correction angle will exceed the maximum correctable angle is low when the method is compared with the first selection method. However, as the period for selecting the data group is longer, it results in referring to data with low relevance to the panning angular velocity during photographing.

The second selection method is a method for selecting between the first selection method and the third selection method, and it is, for example, a method for selecting a range between the starting point of the exposure and a time point returned to the past by only "n" seconds, as shown in R1 of FIG. 6. "n" value is a value that enables, for example, setting a length of one cycle of fluctuation of the hand shake. Note that the frequency of the hand shake is about 5 to 10 Hz, which has a large influence, and the "n" value is set, for example, within the range about 1/5 seconds to 1/10 seconds accordingly. In the second selection method, the correction angular velocity $\Omega_r$, which is near the correction angular velocity during photographing and for which the probability that the correction angle will exceed the maximum correctable angle is finally low can be calculated.

When the panning angular velocity range is selected in step S602 of FIG. 5 and the maximum correction angular velocity is calculated in step S603, the process proceeds to step S604. In step S604, the CPU 103 performs a saving processing of the current panning angular velocity. Hence, information of the current panning angular velocity is added to history information 600. In the present embodiment, the selection processing of the data group of the panning angular velocity to be referred to is performed out of the data group of the current and past panning angular velocity, and the correction angular velocity $\Omega_r$ is determined. Note that with respect to the first to third selection methods, for example, the system can previously determine the method, or the user can determine the method through the operation to designate the method by using the operation unit 110.

Third Embodiment

Figure 7:
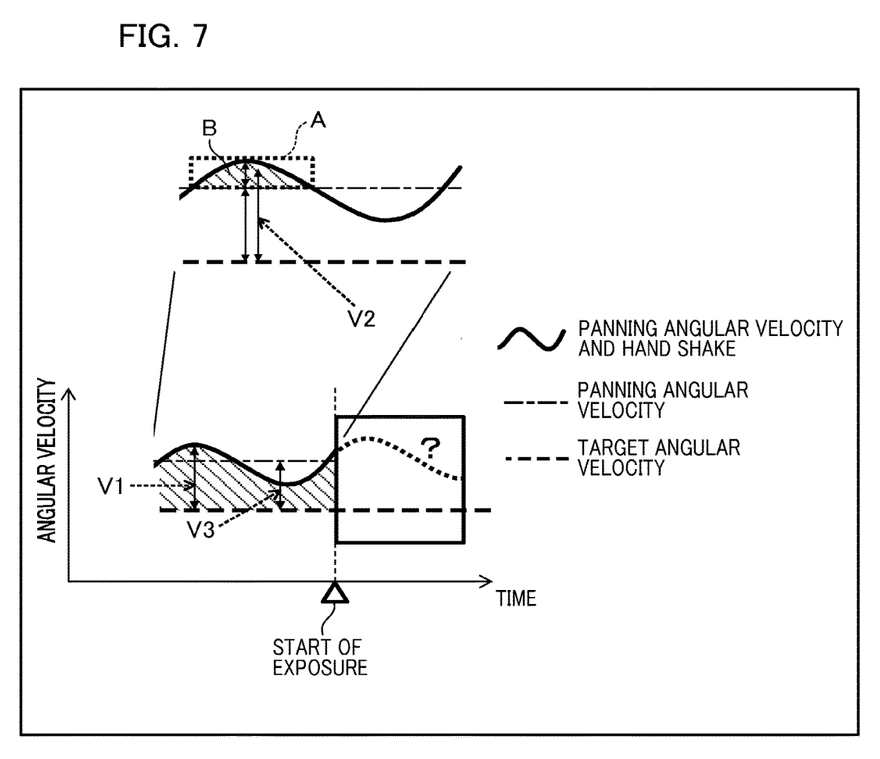
FIG. 7 is a diagram illustrating an example of a calculation processing of the correction angular velocity according to the third embodiment.

Next, third embodiment of the present invention will be described. A process example for calculating the correction angular velocity $\Omega_r$ used in the calculation in step S204b of FIGS. 2A and 2B, based on the data group of the panning angular velocity before the starting point of the exposure, is shown with reference to FIG. 7. In FIG. 7, the horizontal axis is the time axis and the vertical axis is the angular velocity axis. Wavy lines illustrate an example of the angular velocity change including the panning angular velocity and a hand shake component, dash-dotted lines illustrate the panning angular velocity, and dotted lines illustrate the target angle. Note that the selection method of the data group will be described by employing the second selection method described in the second embodiment using FIG. 6. First, a first calculation method in relation to the correction angular velocity $\Omega_r$ will be described. This is a method of using a correction angular velocity when the difference with the target angular velocity is the largest and the necessary correction amount becomes maximum is used out of the panning angular velocity including the past hand shake component, as shown in V1 of FIG. 7. In the first calculation method, a process described in the second embodiment with reference to FIG. 5 is executed. In this method, there is an advantage in which the possibility that the final correction angle exceeds the maximum correctable angle $\theta_{max}$ becomes low as mentioned above because the correction angular velocity having larger correction amount is estimated. However, estimating the correction amount larger than the actual correction amount may cause the longest exposure time $t_{max}$ to become extremely shortened.

The third calculation method will be described before describing second calculation method. This is a method of calculating a value equivalent to the panning angular velocity excluding the hand shake component, based on the panning angular velocity including the past hand shake component and using the difference between this value and the target angular velocity, as shown in V3 of FIG. 7. Note that with respect to the calculation of the panning angular velocity excluding the hand shake component, an approximation processing (average value calculation processing) is performed by averaging the panning angular velocity including the hand shake component. For example, in step S603 of FIG. 5, the process of calculating the average value of the correction angular velocity is executed in place of the calculation of the maximum value of the correction angular velocity. In this method, it is possible to estimate a longer longest exposure time $t_{max}$ because the correction angular velocity $\Omega_r$ near the actual correction angular velocity is estimated. However, when the correction amount in the actual photographing is larger than the average value, a case in which the final correction angle exceeds the maximum correctable angle $\theta_{max}$ as mentioned above may occur.

Figure 8:
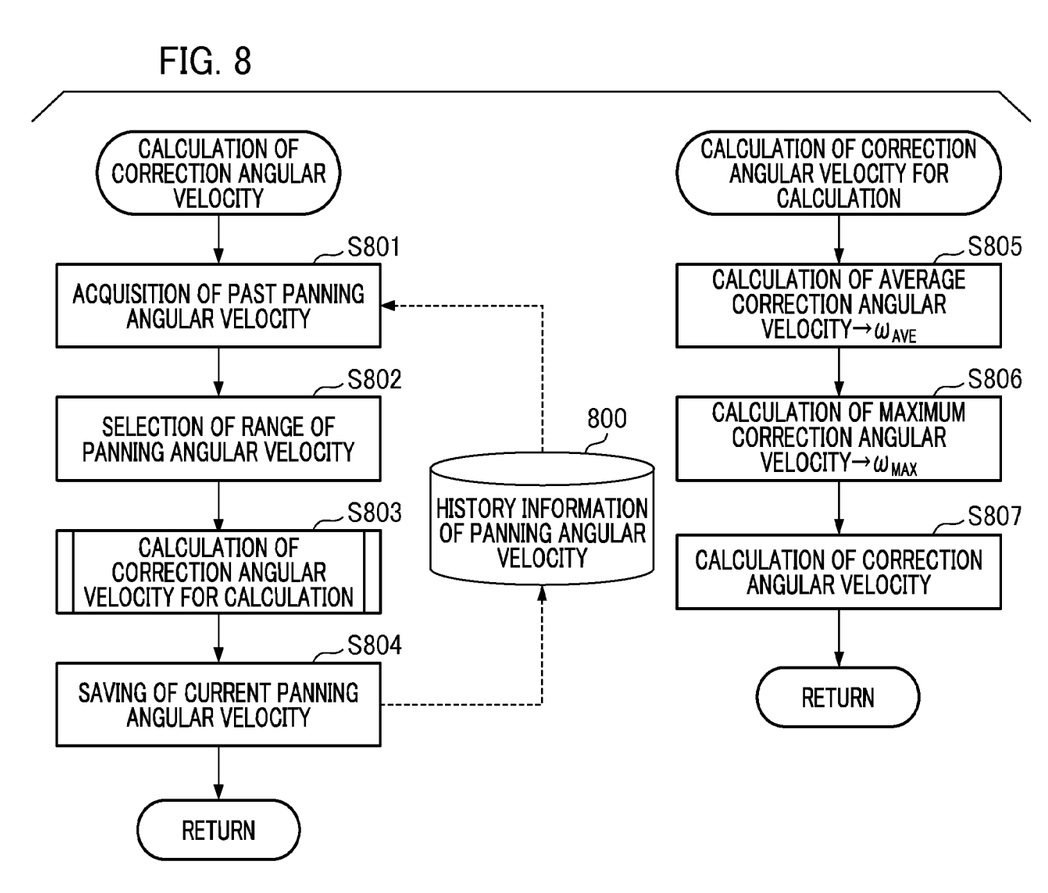
FIG. 8 is a flowchart illustrating the calculation processing of the correction angular velocity according to the third embodiment.

The second calculation method is a method of selecting the method between the first calculation method and the third calculation method, and it is a method of, for example, selecting a value shown in V2 at the upper of FIG. 7. The process flow will be described with reference to a flowchart in FIG. 8. A fundamental process flow is similar to those described in the second embodiment with reference to FIG. 5, and each of the processes of steps S801, S802 and S804 in FIG. 8 is similar to those of steps S601, S602 and S604 shown in FIG. 5. Accordingly, the process of step S803, which is different, will be described.

The CPU 103 advances the process from step S802 to step S803, and executes the calculation processing of the angular velocity for calculation. That is, the process proceeds to step S805 and the average correction angular velocity (written as "$\omega_{AVE}$") is acquired. A value of $\omega_{AVE}$ is acquired by the process to average the difference between the panning angular velocity including the past hand shake component and the target angular velocity. In the following step S806, the CPU 103 calculates the maximum correction angular velocity (written as "$\omega_{MAX}$"). This is calculated similarly to the method shown in the second embodiment. When the average correction angular velocity $\omega_{AVE}$ and the maximum correction angular velocity $\omega_{MAX}$ are calculated, the CPU 103 advances the process to step S807, and the correction angular velocity $\Omega_r$ is calculated by formula below.

$$\Omega_r = \omega_{AVE} + (\omega_{MAX} - \omega_{AVE}) \times m \quad \text{[Formula 12]}$$

In the formula 12, a value calculated by multiplying "m" by the hand shake amplitude to the correction amount to correct the difference between the panning angular velocity excluding the hand shake component and the target angular velocity is added to $\omega_{AVE}$. Here, the fixed number "m" is "m<1". For example, a ratio of an area B to an area A shown in FIG. 7 is used for the fixed number "m". When the fluctuation due to the hand shake is approximated by a sine wave of the amplitude "y" and the ratio of the area B to the area A is defined as "m", the value "m" is determined as the following.

$$A = \pi \times y \quad \text{[Formula 13]}$$

$$B = \int_0^\pi y\sin\theta d\theta = [-y\cos\theta]_0^\pi = 2y$$

$$m = \frac{B}{A} = \frac{2}{\pi}$$

After calculating the correction angular velocity $\Omega_r$ in step S807 of FIG. 8, the process proceeds to step S804, and the information of the current panning angular velocity is added to the history information 800.

In the second calculation method, the longest exposure time $t_{max}$ can be prolonged while suppressing the possibility that the final correction angle exceeds the maximum correctable angle $\theta_{max}$. In the present embodiment, the correction angular velocity $\Omega_r$ used for the calculation in step S204b of FIGS. 2A and 2B is calculated according to the first to third the calculation methods based on the data group of the past panning angular velocity. Note that with respect to the first to third calculation methods, for example, the system can determine the method beforehand, or the user can determine it through the operation to designate the method by using the operation unit 110. As described above, the present invention has been described in detail based on its preferred embodiments, but the present invention is not limited to their specific embodiments, and includes various embodiments without departing from the scope of the invention. It may be possible to appropriately combine a part of the above mentioned embodiments.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-077284, filed Apr. 3, 2014, which is hereby incorporated by reference herein in its entirety.

What is claimed is:

1. An image processing apparatus that corrects, by movement of an optical member or an imaging element, a position of an object image in an image, which is to be captured by performing panning of a camera, the apparatus comprising:
a drive mechanism configured to control the position of the object image in a direction that is perpendicular to an optical axis by driving the optical member or the imaging element; and
at least one processor configured to function, on the basis of a program stored in a memory, as units comprising an exposure time setting unit configured to set an exposure time during image capturing,
wherein the exposure time setting unit (a) determines an upper limit value of the exposure time based on (1) a difference between an output of a first detection unit that detects movement of the apparatus by an angular velocity sensor and an output of a second detection unit that detects movement of the object image, the second detection unit being another of the units which the at least one processor functions as, and (2) an upper limit of a correction range by the optical member or the imaging element, and (b) sets the exposure time during image capturing to the upper limit value or less,
wherein in determining the upper limit value and setting the exposure time, the exposure time setting unit (1) acquires the output of the first detection unit in a period before the start timing of the exposure, (2) performs a process to average the difference between the acquired output of the first detection unit and the output of the second detection unit in the period, (3) adds, to the average value, a value calculated by multiplying, by a fixed value, the difference between a maximum value of the output of the first detection unit and the average value calculated by the averaging process in the period, and (4) determines the upper limit value by using a result of the addition, and
wherein the drive mechanism controls the position of the object image in the direction that is perpendicular to the optical axis by driving the optical member or the imaging element until the passage of the set exposure time.

2. The image processing apparatus according to claim 1, wherein the second detection unit detects a moving speed from a time change of the object image.

3. The image processing apparatus according to claim 1, wherein the exposure time setting unit acquires the output of the first detection unit in a period between a timing of receiving an operation instruction for photographing and the start timing of the exposure to determine the upper limit value, and sets the exposure time during image capturing.

4. The image processing apparatus according to claim 1, wherein the exposure time setting unit acquires the output of the first detection unit in a period between a past timing set according to a cycle of fluctuation of a hand shake and the start timing of the exposure to determine the upper limit value, and sets the exposure time during image capturing.

5. An image capturing apparatus comprising:
an image capturing device; and
the image processing apparatus according to claim 1.

6. A control method executed in an image processing apparatus that corrects, by movement of an optical member or an imaging element, a position of an object image in a direction that is perpendicular to an optical axis in an image, which is to be captured by performing panning of a camera, the method comprising:
setting an exposure time during image capturing by an exposure time setting unit; and
controlling a position of the object image by driving the optical member or the imaging element,
wherein, in the setting, (a) an upper limit value of the exposure time is determined based on (1) a difference between an output of a first detection unit that detects movement of the apparatus by an angular velocity sensor and an output of a second detection unit that detects movement of the object image and (2) an upper limit of a correction range by the optical member or the imaging element, and (b) the exposure time during image capturing is set to the upper limit value or less,
wherein, in the setting, (1) the output of the first detection unit in a period before the start timing of the exposure is acquired, (2) a process to average the difference between the acquired output of the first detection unit and the output of the second detection unit in the period is performed, (3) a value calculated by multiplying, by a fixed value, the difference between a maximum value of the output of the first detection unit and the average value calculated by the averaging process in the period is added to the average value, and (4) the upper limit value is determined value by using a result of the addition, and
wherein, in the controlling, the position of the object image in the direction that is perpendicular to the optical axis is controlled by driving the optical member or the imaging element until the passage of the set exposure time.

* * * * *